Aug. 7, 1928.
J. A. CRAIG
1,680,088
AUXILIARY SLIDE SUPPORT FOR MACHINE TOOLS
Filed Jan. 26, 1927   2 Sheets-Sheet 1
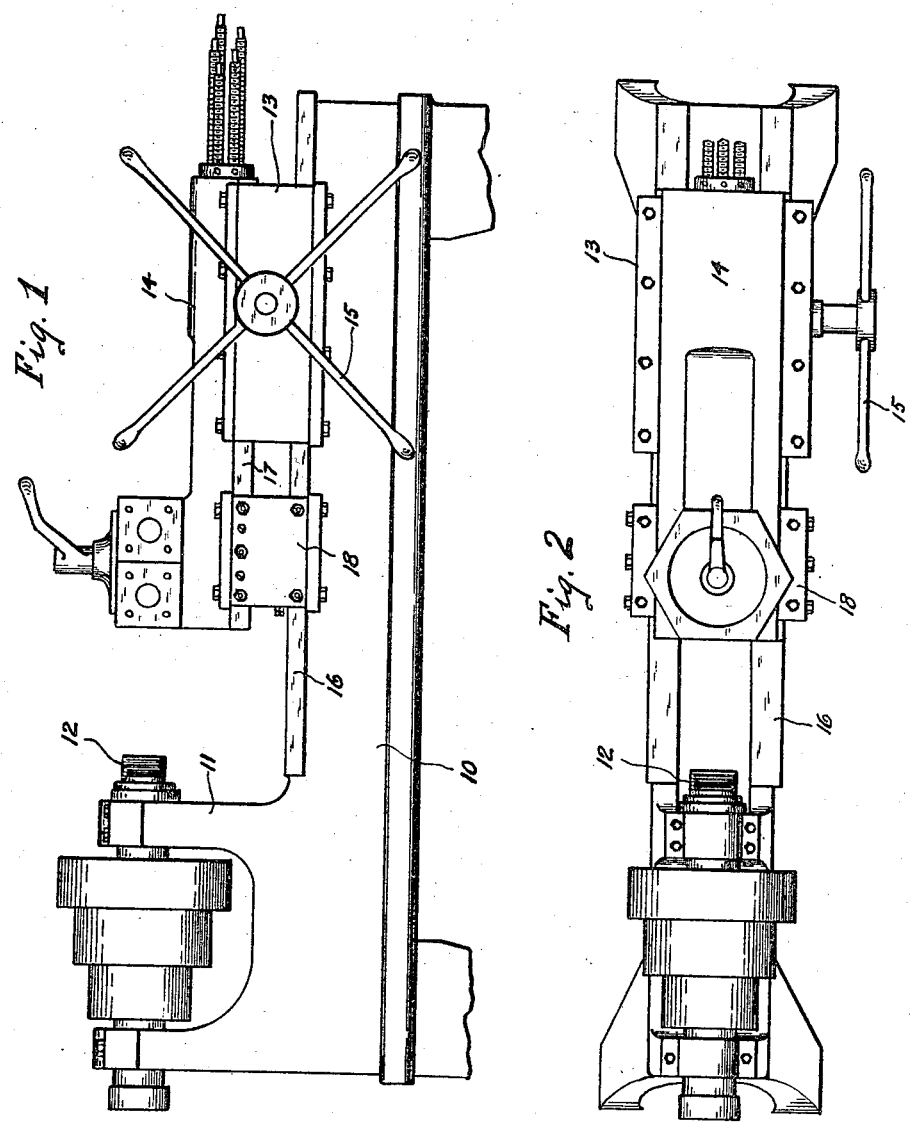
Inventor
James A. Craig
Kwis Hudson + Kent
Attys.

Aug. 7, 1928.  J. A. CRAIG  1,680,088
AUXILIARY SLIDE SUPPORT FOR MACHINE TOOLS
Filed Jan. 26, 1927  2 Sheets-Sheet 2
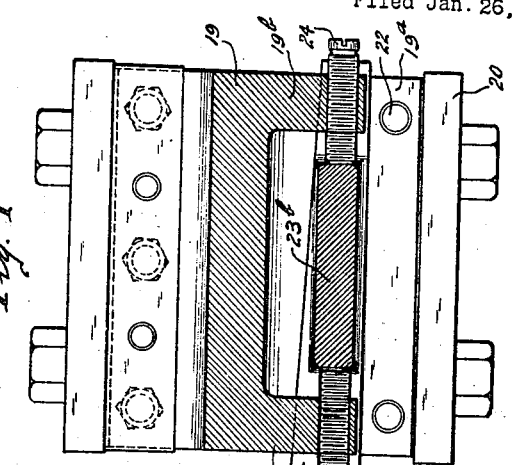
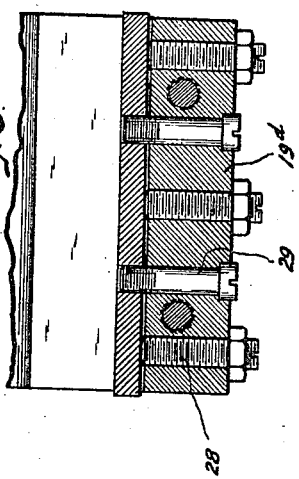
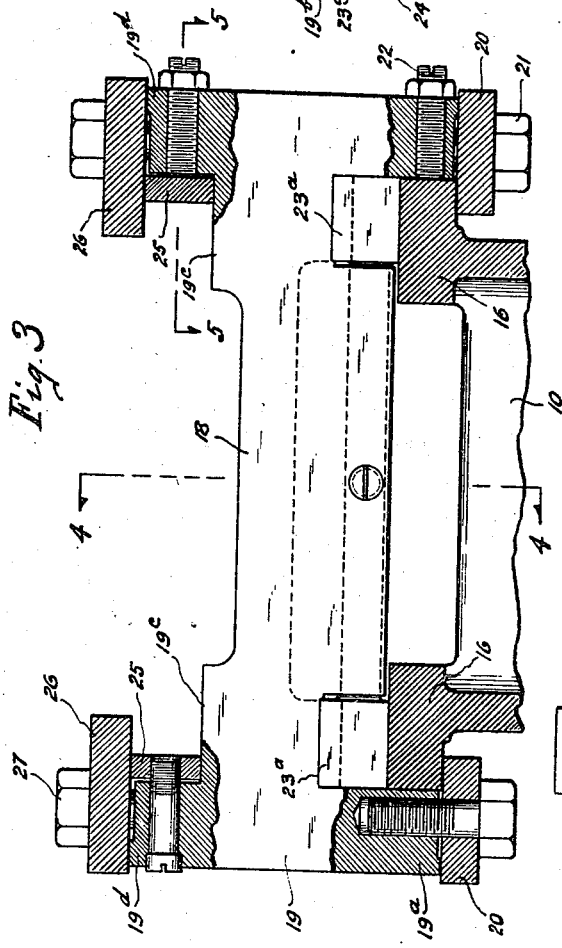
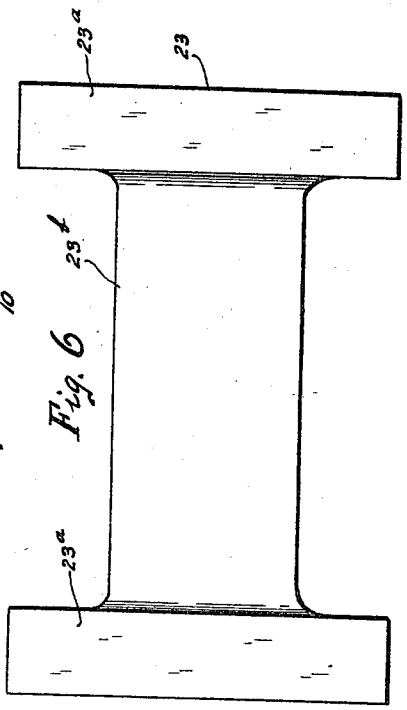
Inventor
James A. Craig
Knox Hudson Kent
Attys Patented Aug. 7, 1928.

1,680,088

UNITED STATES PATENT OFFICE.

JAMES A. CRAIG, OF EAST CLEVELAND, OHIO, ASSIGNOR TO THE WARNER & SWASEY COMPANY, OF CLEVELAND, OHIO, A CORPORATION OF OHIO.

AUXILIARY SLIDE SUPPORT FOR MACHINE TOOLS.

Application filed January 26, 1927. Serial No. 163,585.

This invention relates to machine tools, such as turret lathes and the like, and has particular reference to lathes employing a tool holding slide which at times is required to overhang or project forwardly beyond the usual slide support, generally a saddle carried by the bed. When the slide overhangs the support a considerable distance, as is sometimes the case when the nature of the work requires both long and short tools which necessitates a long return movement of the slide in order that the tools may clear the work to allow indexing of the turret, the overhang generally allows a certain amount of play or give which, if not eliminated, results in inaccurate or unsatisfactory work.

The object of the present invention is to avoid this objection by providing an auxiliary slide support which can be positioned on the bed in advance of the main slide support, the auxiliary support embodying means whereby the slide engaging surfaces may be adjusted preferably both vertically and laterally so that the slide may properly engage the same and have the proper slide supporting function.

The invention may be briefly summarized as consisting in certain novel details of construction and combinations and arrangements of parts which will be described in the specification and set forth in the appended claims.

In the accompanying sheets of drawings illustrating an embodiment of my invention which operates very satisfactorily, Fig. 1 shows my invention applied, by way of example, to a turret lathe, this view being a side elevation of the lathe; Fig. 2 is a plan view of the same; Fig. 3 is an end view of the auxiliary slide support with the ways of the bed and certain portions of the auxiliary support in section; Fig. 4 is a sectional view substantially along the line 4—4 of Fig. 3; Fig. 5 is a sectional view substantially along the line 5—5 of Fig. 3; and Fig. 6 is a plan view of the lower adjustable member of the auxiliary slide support.

Referring now to the drawings, 10 represents the bed of the lathe having a headstock 11 supporting a rotary work holding spinding 12. Supported by the bed, and in this instance on a saddle 13, is a slide 14 which may be moved back and forth over the saddle either by power or manually, and in this instance I have shown means consisting of a so-called turnstile 15 for moving the slide back and forth. The saddle is supported on ways 16 of the bed, and it may be moved lengthwise thereof and clamped thereto by clamps and screws. The saddle as usual has ways which are engaged by way engaging surfaces 17 of the slide.

The lathe so far described is of usual and common construction and further illustration and description thereof are unnecessary.

Coming now to the part directly involving the present invention, it will be observed that I have provided on the ways 16 of the bed an auxiliary slide support 18 which, like the saddle, may be moved lengthwise of the ways and clamped in position.

Inasmuch as the auxiliary slide support is at times unnecessary and can be removed from the bed, and as it is adapted to be used on any one of a number of machines, I have embodied in this auxiliary support a number of adjustable features, preferably including means for adjusting the slide engaging surfaces of the support both as to height and laterally, so that the support and particularly the way engaging portions thereof may be properly positioned so that the support may function in the intended manner.

By reference to Figs. 3 to 6, it will be observed that the auxiliary slide support comprises a main member 19 which, when viewed from the end as in Fig. 3, is substantially H-shaped. This member 19 has at opposite sides downwardly extending portions $19^a$ which extend over and engage the outer surfaces of the ways 16 of the bed. On the lower sides of these portions are clamps 20 which can be tightened and loosened by screws 21 and are adapted to engage the under side of the ways 16 of the bed. Screws 22 extend laterally through these portions $19^a$ and are adapted to engage the outer surfaces of the ways to clamp the support in place on the ways after the clamps 20 have been tightened.

The auxiliary slide support 18 includes, in addition to the main member 19, a second member 23 which in plan is substantially H-shaped, as will be noted from Fig. 6. This member 23 is composed of two parallel portions $23^a$ and a connecting web portion $23^b$. The portions $23^a$ rest upon the ways 16 of the bed, as clearly shown in Fig. 3, and constitute a support for the main body member

19. The web portion 23$^b$ extends crosswise of the bed and lies between two downwardly extending front and rear side portions 19$^b$ of the body member 19 of the auxiliary support.

It will be observed by reference to Fig. 4 that the top surfaces of the portions 23$^a$ of the member 23 are tapered and that the corresponding surfaces of the member 19 which rest upon these portions 23$^a$ are correspondingly tapered, the direction of the taper being lengthwise of the bed. In other words, the upper member 19 of the auxiliary support rests upon the wedge-shaped portions of the lower member 23 which in turn engage the ways of the bed. This constuction admits of vertical adjustment of the slide engaging portions of the auxiliary support, and for the purpose of bringing about this adjustment, the downwardly extending portions 19$^b$ of the member 19 are provided with set screws 24 which engage opposite sides of the web portion 23$^b$ of the lower member 23, as clearly illustrated in Fig. 4.

The upper member 19 of the auxiliary slide support is provided at the top with ways forming slide engaging surfaces. These ways or slide engaging surfaces include horizontal surfaces 19$^c$ machined on the body member 19. Additionally, they include lateral or side surfaces formed on laterally adjustable gibs 25 and also top surfaces formed by clamps 26 which are normally held by screws 27 down against the gibs 25 and against top surfaces formed on upwardly projecting side portions 19$^d$ of the body member 19, these side portions being just outside of the gibs 25.

The gibs 25 are laterally adjustable so as to adjust laterally the ways of the auxiliary slide support, i. e., the portions of the ways which are engaged by the sides of the way engaging portions of the slide. To adjust these gibs laterally and to hold them in any adjusted position, the arrangement shown in Fig. 5 is preferably employed. This includes for each gib a series of set screws 28 and a series of screws 29. The set screws 28 extend through the upstanding portion 19$^d$ of the member 19 and bear against the outer side of the gib whereas the screws 29 pass through the same portion 19$^d$ of the member 19 and engage in tapped holes extending through the gib.

With these screws 28 and 29, which are preferably arranged in a horizontal row and are alternated as illustrated in Fig. 5, it is possible to laterally adjust the gib either in or out and to then hold the gib against lateral movement in either direction, and it is possible since the screws are distributed along or lengthwise of the gib to adjust the gib not only laterally but angularly to line up the gib with reference to axis or movement of the slide, and thus compensate for a misalignment of the auxiliary slide support on the bed. In this connection it might be stated that the provision of an adjustment of this character does away with the necessity of accurately positioning the auxiliary slide support on the bed with reference to lateral alignment. That is to say, it can be applied and clamped in position irrespective of lateral alignment requirements, after which both lateral and angular adjustments of the gibs 25 can be made to obtain perfect sliding engagement between the auxiliary support and the support engaging portions of the slide. Of course, before the gib is adjusted the corresponding top clamp is loosened and after it has been adjusted to the right position and locked in that position the clamp 26 is again tightened.

It will be seen, therefore, that the slide engaging surfaces of the auxiliary slide support can be adjusted vertically by adjusting the set screws 24, this causing a relative adjustment of the engaging tapered surfaces of the members 19 and 23. It also will be seen that the necessary lateral adjustment can be given to the slide engaging surfaces or to the portions thereof which engage the sides of the way engaging portions of the slide by laterally adjusting the gibs 25. By these adjustments it is possible to place the auxiliary support on the bed of the lathe whenever the auxiliary support is needed to support the portion of the slide which overhangs the main support, and the slide engaging surfaces of the auxiliary slide support can very readily be lined up with the slide so that the slide will properly engage the auxiliary slide support and will be supported thereon in the desired and intended manner.

While I have shown the preferred construction, I do not desire to be confined to the precise details illustrated in so far as the auxiliary support is concerned. Furthermore, while I have shown the auxiliary support applied to a particular kind of machine tool, i. e., a turret lathe, it may be used to advantage on other types of machine tools, and while the main slide support is in this instance in the form of a saddle which is movable lengthwise of the bed on the main ways thereof, I do not regard it essential to the invention that an adjustable saddle be employed as the main support for the slide, though this arrangement is generally used. I, therefore, aim in my claims to cover all modifications which do not involve a departure from the spirit and scope of my invention in its broadest aspects.

Having thus described my invention, I claim:

1. In a machine tool, a bed having a slide support, a slide movable thereon, and an auxiliary slide support carried by the bed, said auxiliary support comprising upper and lower members relatively adjustable to vary the height of slide engaging surfaces and also having means for laterally adjusting the slide engaging surfaces.

2. In a machine tool, a bed having a slide support, a slide movable thereon, and an auxiliary slide support comprising upper and lower members relatively adjustable to vary the height of slide engaging surfaces and members for adjusting laterally the slide engaging surfaces.

3. In a machine tool, a bed having a slide support, a slide movable thereon, and an auxiliary slide support, said auxiliary support comprising upper and lower members adjustable relatively to vary the height of slide engaging surfaces, the upper member having means for adjusting laterally the slide engaging surfaces.

4. In a machine tool, a bed having a slide support, a slide movable thereon, and an auxiliary slide support, said auxiliary support comprising upper and lower members adjustable relatively lengthwise of the bed to vary the height of slide engaging surfaces, the upper member carrying the means for adjusting laterally the slide engaging surfaces.

5. In a machine tool, a bed having a slide support, a slide movable thereon, and an auxiliary slide support, said auxiliary support comprising upper and lower members relatively adjustable lengthwise of the bed and members adjustable laterally of the bed to vary the height and lateral position of slide engaging surfaces.

6. In a machine tool, a bed having a slide support, a slide movable thereon, an auxiliary support on the bed for the slide, said auxiliary support having inner members adjustable laterally, and means for adjusting said members comprising adjusting screws passing through the support, part having their ends abutting against the said members and part having threaded engagement therewith.

In testimony whereof, I hereunto affix my signature.

JAMES A. CRAIG.